US012736096B2

United States Patent

(12) United States Patent
Wassermann et al.

(10) Patent No.: US 12,736,096 B2
(45) Date of Patent: Sep. 15, 2026

(54) OVERLOAD CLUTCH ARRANGEMENT

(71) Applicant: SVM Schultz Verwaltungs-GmbH & Co. KG, Memmingen (DE)

(72) Inventors: Ralph Wassermann, Holzgünz (DE); Johannes Scholz, Pfaffenhausen (DE); Robin Deuse, Lachen (DE); Jürgen Heinzmann, Babenhausen (DE)

(*) Notice: Subject to any disclaimer, the term of this patent is extended or adjusted under 35 U.S.C. 154(b) by 0 days.

(21) Appl. No.: 19/273,875

(22) Filed: Jul. 18, 2025

(65) Prior Publication Data

US 2026/0029028 A1 Jan. 29, 2026

(30) Foreign Application Priority Data

Jul. 23, 2024 (DE) ......................... 102024120872.4

(51) Int. Cl.
*F16D 43/208* (2006.01)
*F16D 43/202* (2006.01)

(52) U.S. Cl.
CPC ....... *F16D 43/208* (2013.01); *F16D 43/2024* (2013.01)

(58) Field of Classification Search
CPC ................................ F16D 7/10; F16D 43/208
See application file for complete search history.

(56) References Cited

U.S. PATENT DOCUMENTS 3,693,381 A * 9/1972 McGee ................. B25B 23/145 81/474
3,727,432 A * 4/1973 Eaves ................... F16D 43/208 279/22
3,827,260 A * 8/1974 Kato ......................... F16D 7/10 464/35
4,311,224 A * 1/1982 Kato ....................... F16D 47/02 464/36
5,733,196 A * 3/1998 Nienhaus .................. F16D 7/04 192/104 B
9,151,343 B2 * 10/2015 Norton ................. B25J 17/0233
(Continued)

FOREIGN PATENT DOCUMENTS

DE 127 011 A1 8/1977
DE 10 2008 002 591 A1 12/2009
(Continued)

OTHER PUBLICATIONS

Deutsches Patent—und Markenamt, Office Action dated Mar. 18, 2025, 5 pages.

*Primary Examiner* — Stacey A Fluhart
(74) *Attorney, Agent, or Firm* — Keith C. Rawlins, Esq.; Scheef & Stone, L.L.P.

(57) ABSTRACT

An overload clutch arrangement, through which a longitudinal axis passes, has a guide means, at least one latching element movably received in a bore of the guide means, a structural member having a latching receptacle, and a displacement element movable along the longitudinal axis and which can displace the at least one latching element into the latching receptacle, wherein the at least one latching element is adjustable between a latching position in which it engages in its latching receptacle and rotationally fixedly couples the guide means to the structural member and a freewheel position in which it is arranged outside its latching receptacle and allows freewheeling of the structural member relative to the guide means.

19 Claims, 7 Drawing Sheets

(56) References Cited

U.S. PATENT DOCUMENTS

| | | | | |
|---|---|---|---|---|
| 2020/0347916 | A1* | 11/2020 | Sung | B60W 30/1819 |
| 2024/0181808 | A1* | 6/2024 | Nelson | B60B 27/047 |

FOREIGN PATENT DOCUMENTS

| | | | | | |
|---|---|---|---|---|---|
| DE | 10 2016 010 914 | B4 | | 2/2025 | |
| EP | 2957788 | A1 | * | 12/2015 | F16D 7/10 |
| GB | 2392966 | A | * | 3/2004 | F16D 43/208 |

* cited by examiner

OVERLOAD CLUTCH ARRANGEMENT

CROSS-REFERENCE TO RELATED APPLICATIONS

This non-provisional application claims the benefit of, and priority to, German Application No. 102024120872.4, filed on Jul. 23, 2024, which is incorporated by reference in its entirety.

FIELD OF THE DISCLOSURE

The present disclosure relates to an overload clutch arrangement.

BACKGROUND

Overload clutches which are arranged between a drive side and an output side are known in practice. In the event of an overload, they interrupt a mechanical force transmission path in order to protect components from damage. However, previously known overload clutches require a large installation space and/or do not have a satisfactory range of functions and/or do not achieve a long service life.

SUMMARY

An overload clutch arrangement, through which a longitudinal axis (A) passes, includes: a guide means; at least one latching element movably received in a bore of the guide means; a structural member having a latching receptacle; and a displacement element movable along the longitudinal axis (A) so as to displace the at least one latching element into the latching receptacle of the structural member; wherein the at least one latching element is adjustable between i) a latching position in which the at least one latching element engages the latching receptacle and rotationally fixedly couples the guide means to the structural member and ii) a freewheel position in which the at least one latching element is arranged outside the latching receptacle and allows freewheeling of the structural member relative to the guide means.

BRIEF DESCRIPTION OF THE DRAWINGS

Further features, details, and advantages of the invention are apparent from the wording of the claims and also from the description below of exemplary embodiments with reference to the drawings, in which:

DETAILED DESCRIPTION

Figure 1:
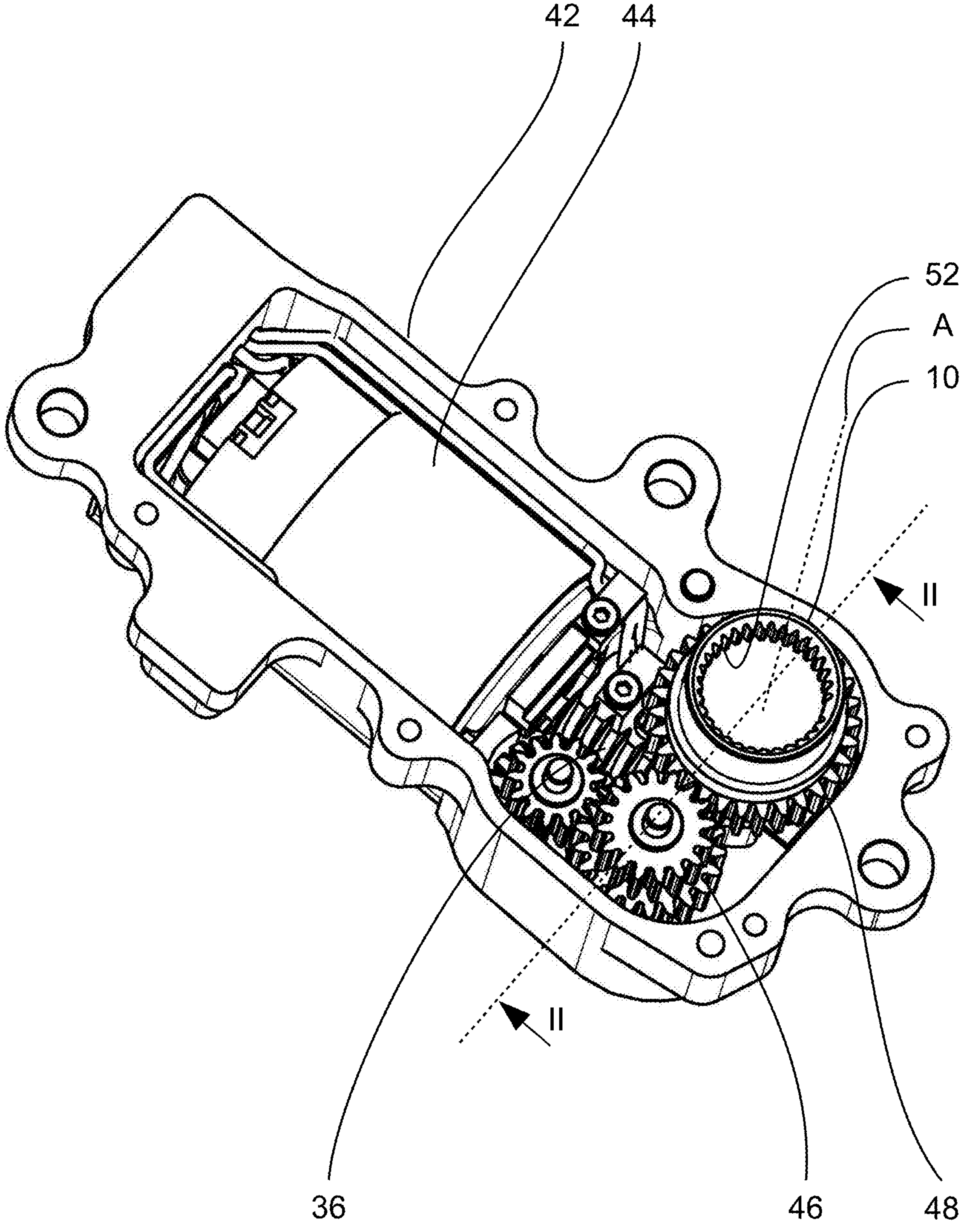
FIG. 1 shows a perspective view of an overload arrangement.
Figure 2:
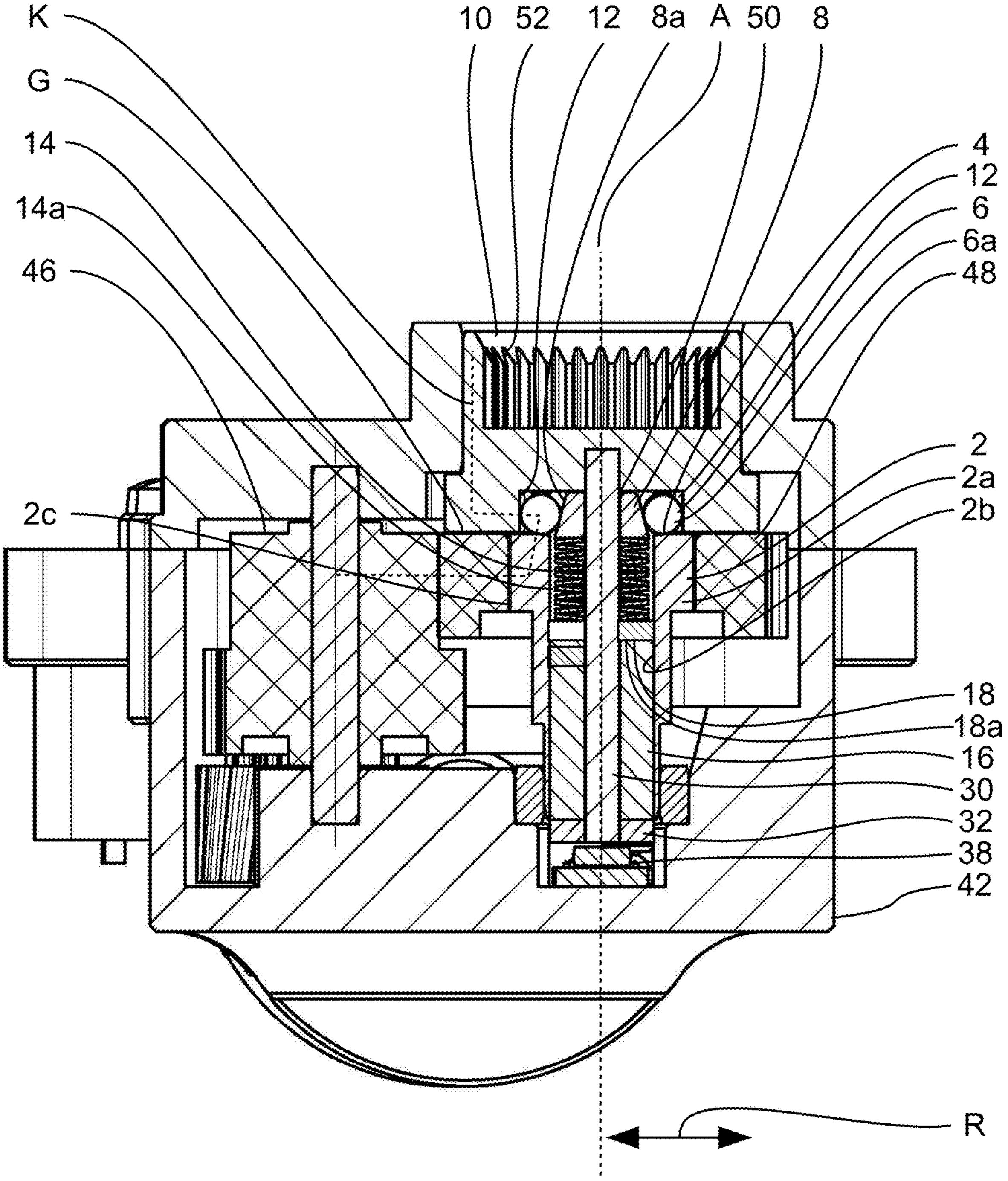
FIG. 2 shows a sectional view along the line II-II from FIG. 1.

In the figures, identical or mutually corresponding elements are each denoted by the same reference signs and therefore, if not expedient, are not described anew. In order to avoid repetition, features that have already been described will not be described again, and such features are applicable to all elements with the same or mutually corresponding reference signs unless this is explicitly ruled out. The disclosures in the description as a whole are transferable analogously to identical parts with the same reference signs or the same structural member designations. It is also the case that the positional indications used in the description, such as for example above/top, below/bottom, lateral, etc., relate to the figure presently being described and illustrated and, in the case of the position being changed, are to be transferred analogously to the new position. Furthermore, it is also possible for individual features or combinations of features from the different exemplary embodiments shown and described to constitute independent or inventive solutions or solutions according to the invention.

Disclosed is an overload clutch arrangement, through which a longitudinal axis passes, comprising a guide means, at least one latching element, which is movably received in a bore of the guide means, a structural member, which has a latching receptacle in which the latching element can optionally engage, and a displacement element, which is movable along the longitudinal axis and can displace the at least one latching element into the latching receptacle, wherein the at least one latching element is adjustable between a latching position, in which it engages in its latching receptacle and couples the guide means to the structural member for conjoint rotation, and a freewheel position, in which it is arranged outside its latching receptacle and allows freewheeling of the structural member relative to the guide means.

The overload clutch arrangement comprises the displacement element in order to displace the at least one latching element into the latching receptacle so as to realize the latching position. This makes it possible in a simple manner to realize a mechanical force flux path. Rotationally fixed means that the elements involved are fastened directly or indirectly to each other and they can rotate together about a common rotational relation. In the rotationally fixed state, the elements involved can remain at relative rest with respect to each other. In the event of an overload, the at least one latching element can be brought out of its latching receptacle in order to realize the freewheel position. A torque that may be present on the drive side or output side can trigger the overload. In the event of an overload, the latching element can be pushed out of its latching receptacle by the structural member, for example. This can interrupt the mechanical force flux path. In the event of overloading, the at least one latching element can be pushed against the displacement element by the structural member, as a result of which the guide means is decoupled from the structural member (freewheeling position). When the overloading eases or the overload falls below the overload-triggering torque, the latching element can return again into its latching receptacle in order to produce the mechanical force flux path again. In particular, components can be protected from damage by the latching element and the displacement element, with the overload clutch arrangement requiring little installation space, providing a desirable range of functions, and being associated with a long service life. Protected components can be, for example, a drive and transmission components.

The overload clutch arrangement can be arranged between a drive side and an output side. The guide means can be arranged on the drive side; the structural member can be arranged on the output side. The latching element can be the boundary element between the drive side and the output side. The latching element can produce a form fit and/or force fit with its latching receptacle in the latching position. The latching element can be adjustable between its positions in the radial direction, with respect to the longitudinal axis. The bore can extend in the radial direction, with respect to the longitudinal axis. This allows the latching element to be guided in the radial direction. The guide means, the latching element, the displacement element and/or the component can be formed separately from one another. This permits freedom of design. The displacement element has an outer circumferential surface on which the at least one latching element lies, preferably in both of its positions. The structural member can be arranged on the outer circumferential side to the guide means, the at least one latching element and/or the displacement element, with respect to the longitudinal axis. This permits a compressed construction that does not require a large installation space along the longitudinal axis. The term structural member means the one mentioned in independent claim 1. The structural member can be a structural member which is rotatable about the longitudinal axis. The structural member can be designed to be fixedly connected to an output shaft. The structural member can be a connecting element to an output shaft. The structural member can be an output shaft or part of an output shaft. The structural member can have an internal and/or external toothing for this purpose.

According to one embodiment, the overload clutch arrangement can comprise a plurality of latching elements and a corresponding number of latching receptacles. The latching elements and latching receptacles can each be distributed equidistantly about the longitudinal axis. This is used for uniform engagement of the latching elements in the latching receptacles. The latching elements can be movably received in corresponding bores of the guide means. The latching receptacles can be formed in the structural member.

According to one embodiment, the displacement element can lie in contact against the structural member in the latching position. This enables the displacement element to be precisely positioned and an end position to be defined. Furthermore, the contacting is used for the adjustability of the precisely defined pretensioning force of the spring means. For reasons of optimizing the installation space, an end face of the displacement element can lie in contact against the structural member in the latching position.

According to one embodiment, the guide means can be a cage sleeve and/or can be arrangeable or can be arranged in the force flux path. The guide means is advantageously a sleeve, and therefore further components can be arranged in its interior so as to save on installation space. The force flux path can run through the cage sleeve. The cage sleeve can have a fastening surface on the outer and/or inner circumferential side. The cage sleeve can be fixedly connected to a gearwheel via the fastening surface. For example, the guide means can form a force-fitting and/or form-fitting connection with the gearwheel. For example, the guide means can form a hexagon stub to which the gearwheel is fastened with a corresponding hexagon socket. This saves on installation space inside the cage sleeve. The cage sleeve can be a separate component to the gearwheel. This reduces production costs and increases the freedom of design. For example, the cage sleeve can be an identical part and the gearwheel can be adapted to the respective overload clutch arrangement. Furthermore, this serves for the use of respectively separate materials in order to exploit the respective specific material properties.

According to one embodiment, the latching element can be a ball. This makes the self-alignment of the latching element irrelevant since a ball can be brought into the positions in every self-alignment. In addition, a ball is particularly suitable for withstanding impacts in the free-wheeling position over a long service life by the structural member which, driven by an overload, is movable in relation to the ball. In addition, the ball can be easily movable between its positions. For example, the ball can interact in a simple manner with the displacement element and can be pushed by it out of a latching receptacle in the event of an overload.

According to one embodiment, the displacement element can comprise an outer diameter which tapers along the longitudinal axis, preferably in the direction of the structural member. A displacement element configured in this way can, depending on its own position along the longitudinal axis, apply a radially outwardly directed force to the at least one latching element. The displacement element can be a cone with a straight or curved outer surface. The conical outer circumferential surface can displace the latching element radially outwards into the latching receptacle. The latching element can also adjust the displacement element along the longitudinal axis via the conical outer circumferential surface.

According to one embodiment, the conical outer circumferential surface, as viewed in longitudinal section, can enclose an angle which can be in the range of 10° to 45°, preferably 10°, with the longitudinal axis. The angle can be used to influence the radial displacement of the latching element and the disengagement force thereof.

According to one embodiment, the overload clutch arrangement can comprise a guide rod on which the displacement element is movably guided along the longitudinal axis. The guide rod can protrude through a guide hole in the displacement element so that the displacement element is internally guided. The guide rod is a separate component from the displacement element. This reduces production costs and increases the freedom of design. The guide rod can reach through the guide means along the longitudinal axis or at least engage there. This allows the best possible use of an installation space.

According to one embodiment, the overload clutch arrangement can comprise a spring means, preferably a disc spring package, which pretensions the displacement element in the direction of the latching element, as a result of which the latching element is pretensioned into its latching position. The pretensioning can be undertaken along the longitudinal axis. The combination of the spring force acting along the longitudinal axis, the displacement element, which is preferably a cone, and the latching element, which is preferably a ball and can move in the radial direction, leads to an orthogonal chain of effect. The spring means generates a spring force which acts on the displacement element. The displacement element in turn transmits this spring force, which is parallel to the longitudinal axis, to the latching element in the radial direction via the conical outer circumferential surface. This enables a very compact design to be achieved. In the event of an overload, the at least one latching element can be brought out of its latching receptacle counter to the spring force in order to realize the freewheeling position.

According to one embodiment, the overload clutch arrangement can comprise an adjusting sleeve, which preloads the spring means in the direction of the latching element. The preloading may comprise pretensioning. It is advantageous that the preloading force can be adjusted by the installation position of the adjusting sleeve, for example when installing the overload clutch arrangement. The adjusting sleeve can be arranged within the guide means or in the interior of the cage sleeve. The adjusting sleeve is arranged there so as to save on installation space. The adjusting sleeve can be connected to the guide means and/or the guide rod by way of a force-fitting and/or form-fitting connection. Preferably by way of an interference fit. This allows the adjusting sleeve to be pressed in and/or pressed on to the extent desired.

According to one embodiment, the overload clutch arrangement can comprise a damping means. The damping means can be a damping ring and/or can be made of elastomeric material. The damping ring can be arranged within the guide means or in the interior of the cage sleeve so as to save on installation space and the guide rod can simultaneously reach through it. Elastomeric material is particularly useful for damping vibrations. The damping means reduces noise from the overload clutch arrangement and results in a smooth operation of the structural member.

According to one embodiment, the spring means, the damping means and the adjusting sleeve can be arranged adjacent to each other in this sequence along the longitudinal axis. This improves the effect of the damping means even further. The spring means can be supported, at one end, against the displacement element, preferably directly, and, at the other end, against one of the adjusting sleeve or damping means, preferably directly. This is also used to optimize installation space.

According to one embodiment, the structural member can have a recess on the end face, in which the latching receptacle and/or a latching element running surface is/are formed. This saves on installation space and results in a compact design. The latching element/latching elements can be arranged within the recess, preferably in the latching position and the freewheeling position. The recess can face the displacement element. The latching element/latching elements can run on the latching element running surface, preferably in the freewheeling position. This is used to ensure reliable guidance in the freewheeling position.

According to one embodiment, the latching element running surface can be formed on the inner circumference of the structural member and/or extend in the circumferential direction about the longitudinal axis. As a result, the latching element/latching elements can be guided radially on the outside.

According to one embodiment, the latching element running surface can run into the latching receptacle. The latching element can therefore change directly from the latching receptacle (latching position) to the latching element running surface (freewheeling position) and vice versa. This permits a design of little complexity. The latching element running surface can be interrupted by the latching receptacle/latching receptacles. The latching element running surface can be segmented in the circumferential direction.

According to one embodiment, the latching element running surface in longitudinal section can have a contour which corresponds to the outer contour of the latching element. This is used to securely guide the latching element in the freewheeling position. The latching element can be a ball, which is why the latching element running surface can then have a circular arc contour corresponding to a ball in longitudinal section. The latching element running surface can be a channel.

According to embodiments, the latching receptacle can

- have a width in the circumferential direction in the range of 0.5 to 1.5 times the diameter of the latching element, and/or
- have opposite side walls, which run parallel to each other or enclose an angle with each other in the range of 10° to 90°, and/or
- together with the latching element in the latching position form an engagement depth which is in the range of 0.1 to 0.45 times the diameter of the latching element, preferably 0.33 times the diameter, and/or
- have an inlet edge, which has a rounding with a radius, and/or
- have an outlet edge, which has a rounding with a radius.

By way of these embodiments, the latching and unlatching of the latching element can be influenced, in particular to facilitate or hinder the respective case. This may interact with the structural refinement or refinement in terms of force of the spring means and/or with the structural refinement of the displacement element. The interaction of these three components can then be used to optimize the installation space. The inlet edge and/or outlet edge can be the impact edge between the latching element running surface and the latching receptacle. This is used for a direct transition. The latching element can enter the latching receptacle via the inlet edge and the latching element can exit from the latching receptacle via the outlet edge.

According to one embodiment, a guide rod can be fixedly connected to the structural member. The guide rod can be the guide rod described above. The guide rod can extend along the longitudinal axis. The guide rod can be rotatable about the longitudinal axis. Since the guide rod can be fixedly connected to the structural member, the rotation of the structural member can thereby be admitted directly into the guide rod. The guide rod can be a separate component from the structural member. This reduces production costs and increases the freedom of design. The guide rod is used for securely guiding components along the longitudinal axis and/or for fastening components to it for secure positioning. The guide rod can reach through the displacement element, the spring means, the adjusting sleeve, and/or the damping means. This is used to optimize the use of installation space. The guide rod can be rotatable relative to the displacement element, to the spring means, to the adjusting sleeve and/or to the damping means. This allows the guide rod to transmit a movement, and the mass to be moved is kept to a minimum. The guide rod can comprise a friction-reducing means on the outer circumferential side, for example a coating. As a result, the sliding friction between the guide rod and adjacent components can be reduced, in particular with respect to the components through which the guide rod protrudes relatively movably. The guide rod is also used to mechanically couple locally more remote components. Thus, for example, the rotational movement introduced at one end into the guide rod can be transmitted to a sensor or a sensor target, which is arranged at the other end of the guide rod. This ensures optimum use of the installation space, and the sensor/sensor target receives the exact position of the structural member or of the output shaft.

According to one embodiment, the overload clutch arrangement can comprise a sensor arrangement, comprising a first sensor target, which is rotationally fixed to the structural member, a second sensor target, which is designed to be rotationally fixed to a drive shaft, a first sensor for sensing the first sensor target, and a second sensor for sensing the second sensor target.

The sensors can be Hall sensors. The sensors can be designed to detect a rotational speed and/or rotational position. The drive shaft can be encompassed by the overload clutch arrangement. A drive can be encompassed by the overload clutch arrangement. The drive can drive the drive shaft. The sensor arrangement has a number of advantages. The first pair of sensors (first sensor, first sensor target) can be arranged on the output side in order to detect an output-side rotational speed and/or rotational position. The second pair of sensors (second sensor, second sensor target) can be arranged on the drive side in order to detect a drive-side rotational speed and/or rotational position. The respective state can thus be determined. Furthermore, a comparison of the output-side rotational speed with the drive-side rotational speed can provide information about an overload event and the load state. On the basis of a comparison of the output-side and the drive-side rotational positions, the drive shaft position can also be readjusted after an overload event. In addition, in the event of an overload, the first sensor still detects the "actual" position of an output shaft and can still provide this information for the entire system.

According to one embodiment, the first sensor target can be fastened to the guide rod. This ensures that the rotation of the guide rod and the sensor target is instantaneous. The first sensor target can be fastened to the end of the guide rod opposite the structural member. As a result, the installation space in the region of the structural member is free of sensor components.

According to one embodiment, a plain bearing can be formed between, on the one hand, the structural member and, on the other hand, the guide means and/or a gearwheel of the guide means. This serves for a compact design. The plain bearing can be used in the freewheeling position in the event of an overload.

In summary, the spring means can generate a defined force on the displacement element, which force is adjustable by the adjusting sleeve and acts along the longitudinal axis. The displacement element pushes with this force onto the at least one latching element which, by way of the cone, experiences a force acting in the radial direction. This force pushes the at least one latching element radially outwards into the latching receptacle of the structural member or the output shaft. There is therefore a form fit, and torque can be transmitted from the drive or transmission to the output shaft (latching position). In the event of an overload, which may be defined as too large a torque, on the structural member or the output shaft, said overload by way of the latching receptacle produces a disengaging force on the at least one latching element. If said disengaging force is greater than the opposite force/force component of the spring force, the at least one latching element disengages from the corresponding latching receptacle counter to said force/force component and there is no longer a form fit (release position). As a result, torque can no longer be transmitted; the clutch is thus free from load and the transmission components are protected. As soon as the torque has been overcome, the at least one latching element latches again into a latching receptacle and the torque of the drive can be transmitted again.

FIGS. 1 to 9 show an embodiment of an overload clutch arrangement. In a housing 42, a drive 44 which drives a drive shaft 36 is arranged on the drive side. Transmission components 46 which transmit the drive force along a mechanical force flux path K into a gearwheel 48 are connected to the drive shaft 36. The gearwheel 48 is rotationally fixedly connected to a guide means 2, which is in the form of a cage sleeve 2*a*.

The overload clutch arrangement is passed through by a longitudinal axis A and, in the embodiment shown, comprises two latching elements 6, which are in the form of balls 6*a* and are movably received in respective bores 4 of the guide means 2. An output-side structural member 10 is provided, which has two latching receptacles 12 for the latching elements 6. The latching elements 6 and the latching receptacles 12 are each distributed equidistantly about the longitudinal axis A. Furthermore, the overload clutch arrangement comprises a displacement element 8, which is configured as a cone and is movable along the longitudinal axis A. Depending on its own positioning along the longitudinal axis A, the displacement element 8 can displace the latching elements 6 into the respective latching receptacle 12. A plain bearing G is formed between, on the one hand, the structural member 10 and, on the other hand, the guide means 2 and/or the gearwheel 48. The plain bearing G is used in the event of an overload if the structural member 10 rotates faster than the guide means 2 and the gearwheel 48 because of an overload. The structural member 10 has an internal toothing 52 to which an output shaft, not illustrated, can be fixedly connected.

The latching elements 6 are adjustable into a latching position S1 (FIG. 3*a*), in which they engage in a latching receptacle 12. In the latching position S1, the guide means 2 is rotationally fixedly coupled to the structural member 10. Along the mechanical force flux path K, the drive force of the drive 44 can then be transmitted to the structural member 10 or to the output side. The latching elements 6 are also adjustable because of an overload into a freewheeling position S2 (FIG. 3*b*), in which they are arranged outside the latching receptacles 12. In the freewheeling position S2, a freewheel of the structural member 10 relative to the guide means 2 is permitted. In the event of an overload, the structural member 10 pushes the latching elements 6 out of the latching receptacles 12.

The latching elements are boundary elements between the drive side and the output side. The guide means 2 is arranged on the drive side and the structural member is arranged on the output side.

The guide means 2 as a cage sleeve 2*a* has an interior 2*b* and, on the outer circumferential side, a fastening surface 2*c* on a designed hexagon, via which the gearwheel 48 is fixedly connected. The bores 4 extend in the radial direction R, with respect to the longitudinal axis A. Thus, the latching elements 6 are adjustable between the positions S1, S2 in the radial direction R, with respect to the longitudinal axis A.

The displacement element 8 as a cone comprises an outer diameter, which tapers along the longitudinal axis A in the direction of the structural member 10. The conical outer circumferential surface 8*a* displaces the latching elements 6 radially outwards into the latching receptacles 12. Conversely, in the event of an overload, the latching elements 6 via the conical outer circumferential surface 8*a* can move the displacement element 8 along the longitudinal axis A in order themselves to pass out of the latching receptacles 12. The conical outer circumferential surface 8*a* encloses an angle W2, as viewed in longitudinal section, with the longitudinal axis A.

The overload clutch arrangement also comprises a spring means 14, which is in the form of a disc spring package 14*a*.

The spring means 14 pretensions the displacement element 8 along the longitudinal axis A onto the latching elements 6. This causes the latching elements to be pretensioned into the latching position S1. In the event of an overload, the latching elements 6 are brought out of the latching receptacles 12 counter to the spring force of the spring means 14 in order to realize the freewheeling position S2.

The overload clutch arrangement also comprises an adjusting sleeve 16, which preloads the spring means 14 in the direction of the latching elements 6. The adjusting sleeve 16 is arranged in the interior 2*b* and is connected to the guide means 2 by way of a force-fitting and/or form-fitting connection.

The overload clutch arrangement also comprises a damping means 18, which is in the form of an elastomeric damping ring 18*a*. The damping means 18 is arranged in the interior 2*b* and can be connected to the guide means 2 by way of a force-fitting and/or form-fitting connection.

The overload clutch arrangement furthermore comprises a guide rod 30, on which the displacement element 8 is guided movably along the longitudinal axis A. The guide rod 30 reaches through a guide hole 50 in the displacement element 8 so that the displacement element 8 is internally guided. The guide rod 30 also reaches through the guide means 2, the spring means 14, the adjusting sleeve 16 and the damping means 18 along the longitudinal axis A. The guide rod 30 is fixedly connected to the structural member 10 and is rotatable relative to the guide means 2, the spring means 14, the adjusting sleeve 16 and the damping means 18. The guide rod 30 extends along the longitudinal axis A, with it being rotatable about the longitudinal axis A.

The structural member 10 has, on the end face, a recess 20, in which the latching receptacles 12 and also a latching element running surface 22 are formed. The guide means 2 engages in the recess 20, and the latching elements 6 are arranged within the recess 20 in the latching position S1 and in the freewheeling position S2. The recess 20 faces the displacement element 8. In the latching position S1, the latching elements 6 are located in the latching receptacles 12, whereas, in the freewheeling position S2, the latching elements 6 run on the latching element running surface 22.

The latching element running surface 22 is formed on the inner circumference 24 of the structural member 10 and extends in the circumferential direction U about the longitudinal axis A. As a result, the latching elements 6 are guided radially on the outside. The latching element running surface 22 runs into the latching receptacles 12. The latching elements can therefore change directly from the latching receptacle 12 (latching position S1) to the latching element running surface 22 (freewheeling position S2) and vice versa. The latching element running surface 22 is clearly interrupted by the latching receptacles 12, and therefore it is segmented in the circumferential direction U. In longitudinal section, the latching element running surface 22 has a contour which corresponds to the outer contour of the latching element 6, this in the present case being a circular arc contour 54 corresponding to a ball. The latching element running surface SS is a channel.

Figure 3A:
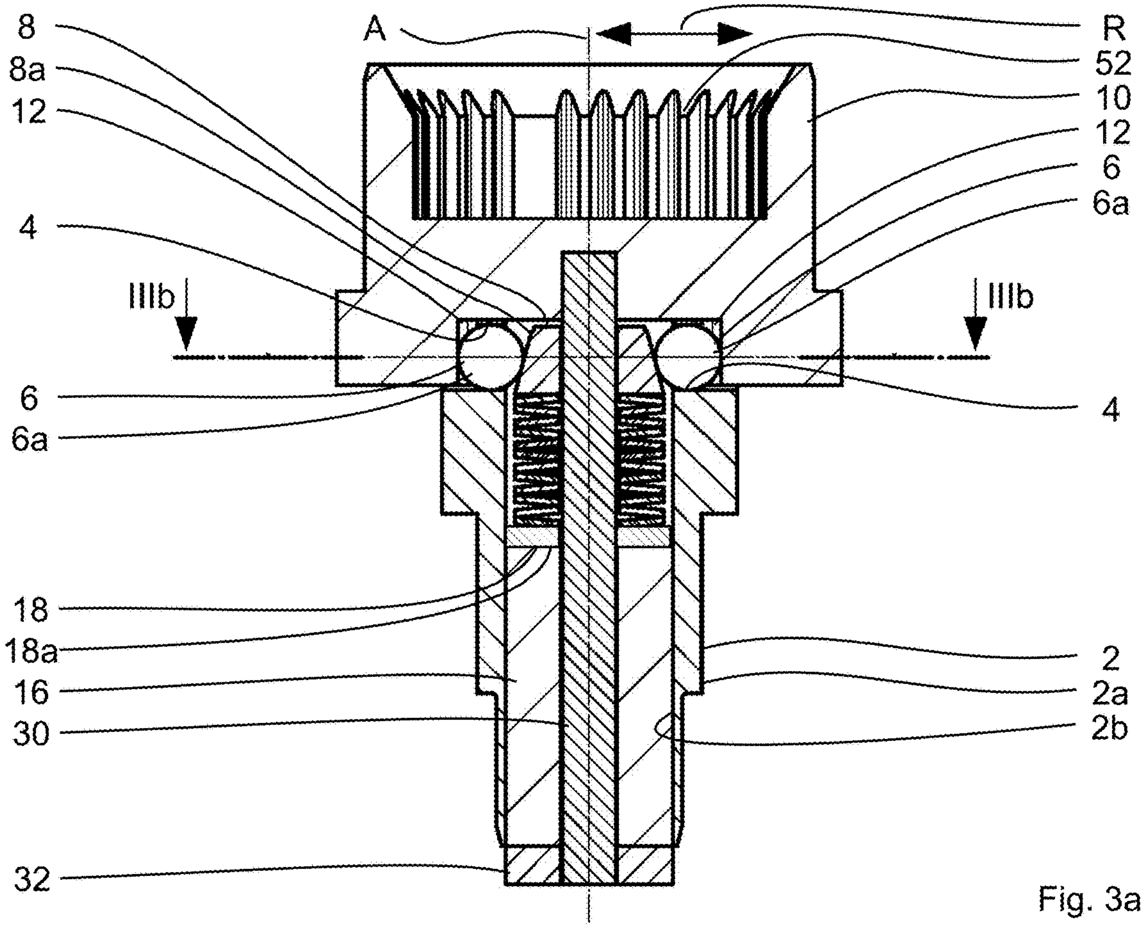
FIG. 3*a* shows a longitudinal sectional view in the latching position.
Figure 3B:
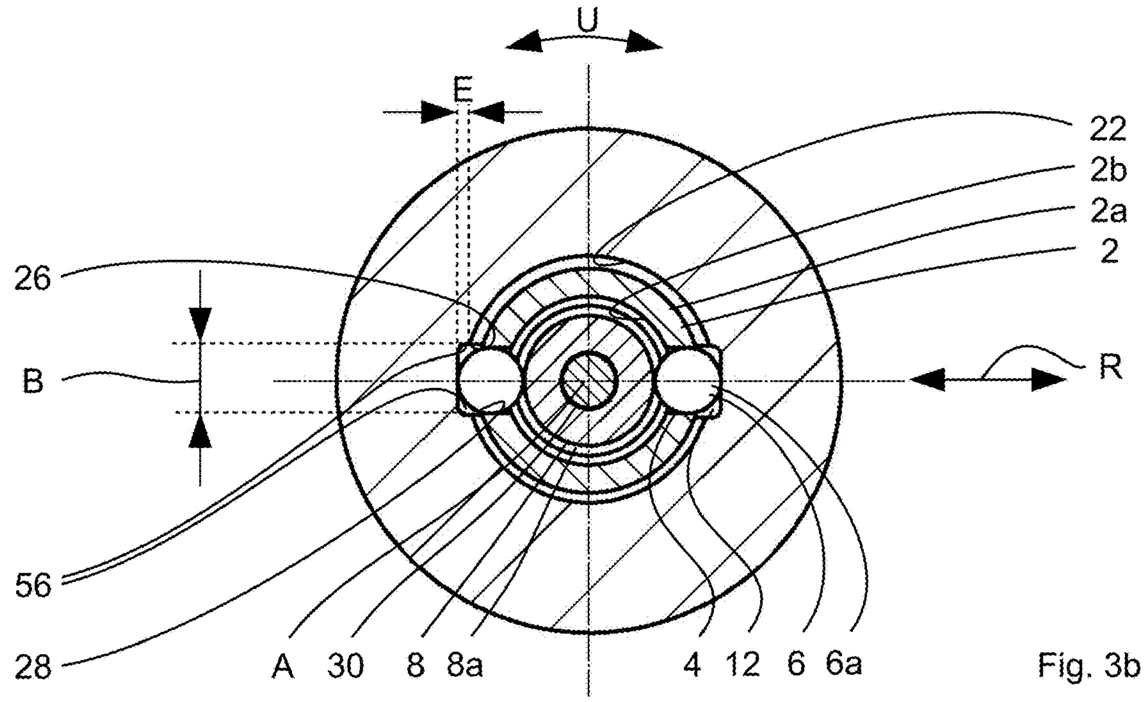
FIG. 3*b* shows a cross-sectional view along the line IIIb-IIIb from FIG. 3*a,*
Figure 4A:
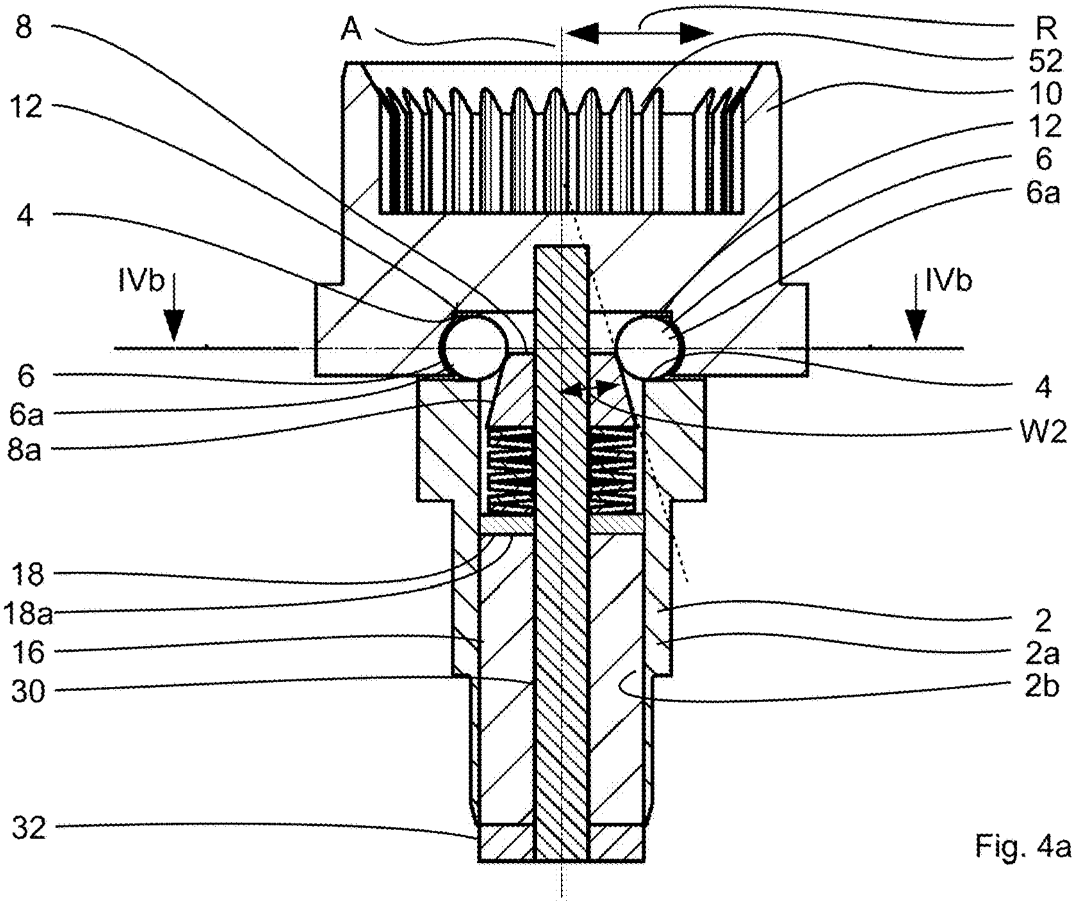
FIG. 4*a* shows a longitudinal sectional view in the freewheeling position.
Figure 4B:
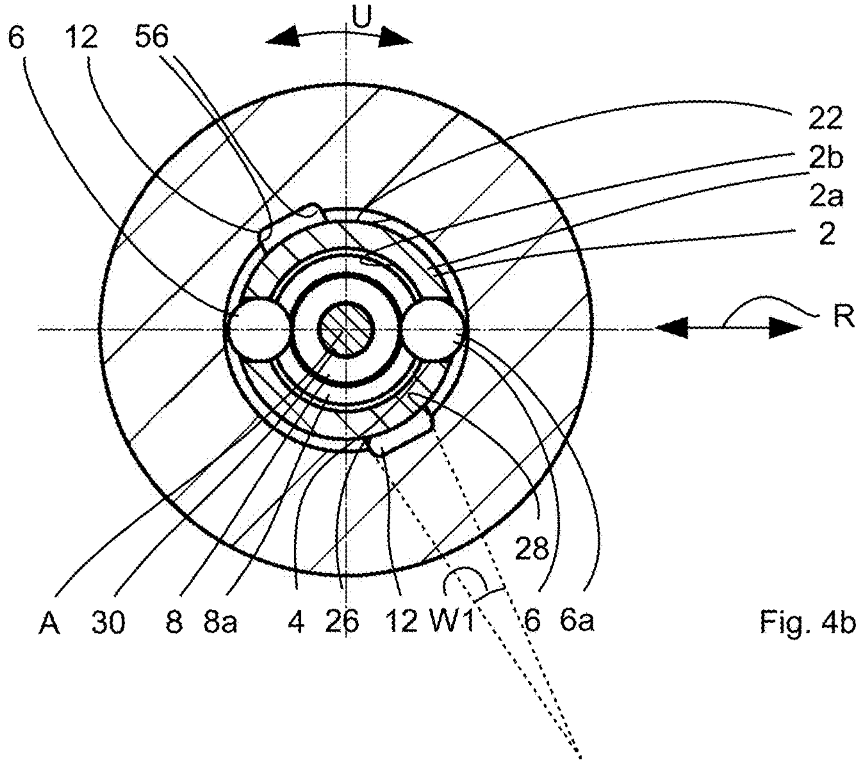
FIG. 4*b* shows a cross-sectional view along the line IVb-IVb from FIG. 4*a,*
Figure 5:
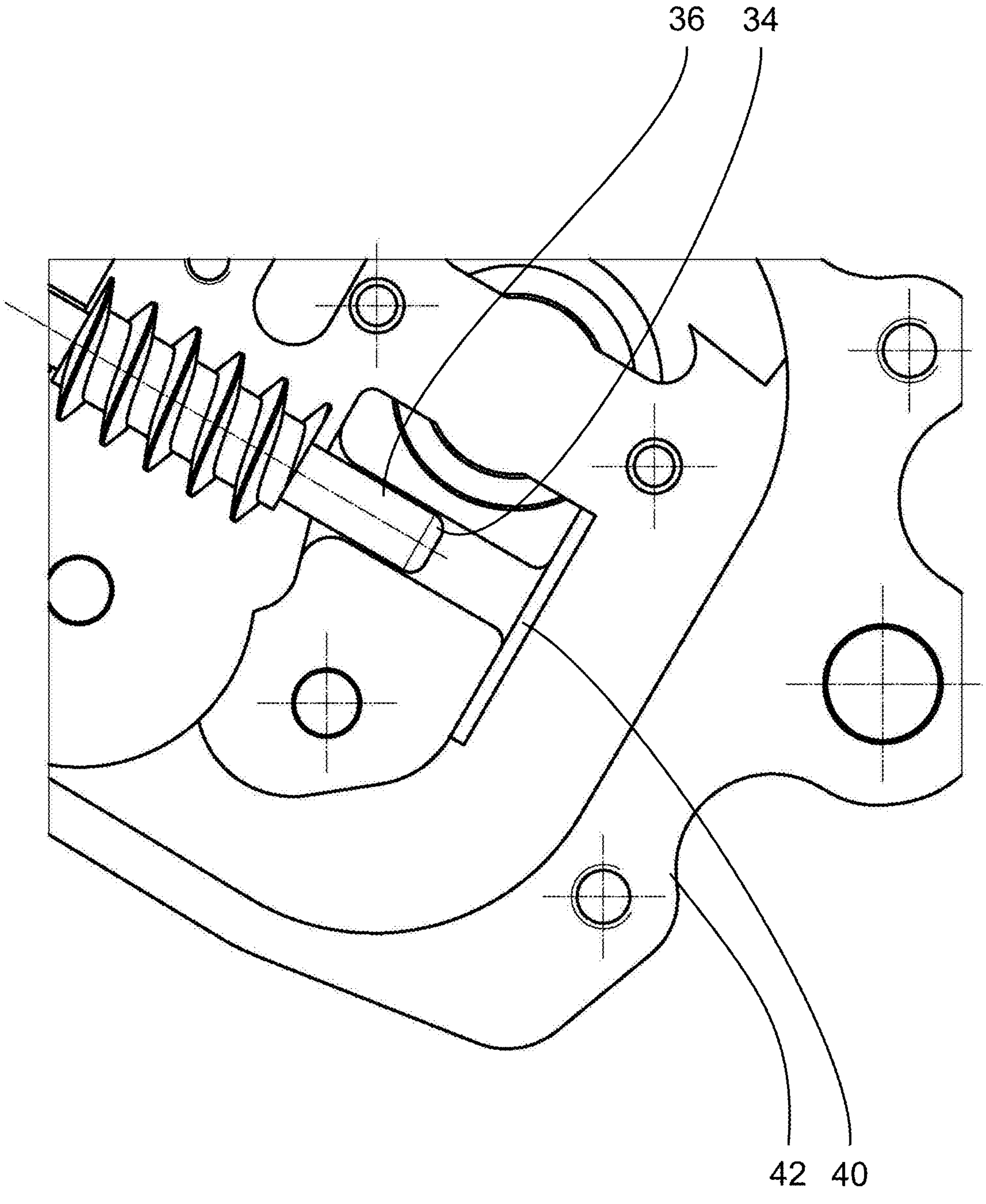
FIG. 5 shows a detailed view from FIG. 1.
Figure 6:
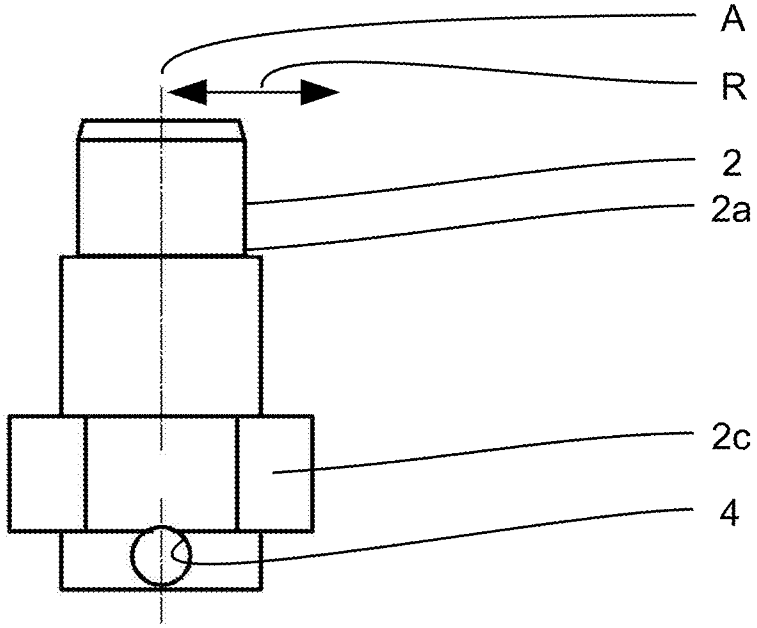
FIG. 6 shows a first view of a guide means.
Figure 7:
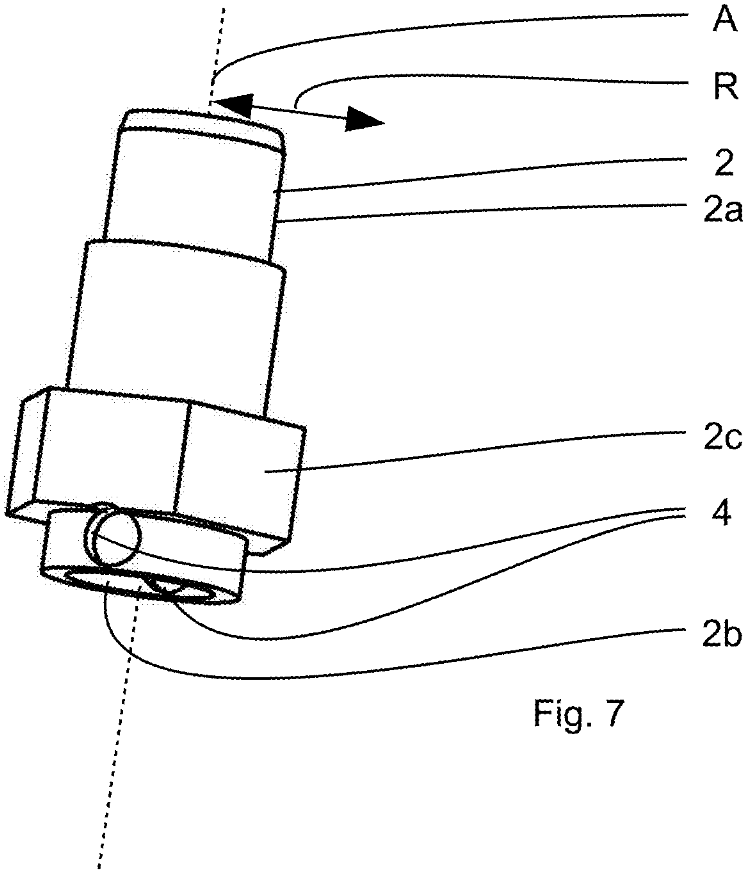
FIG. 7 shows a perspective view of the guide means from FIG. 6.
Figure 8:
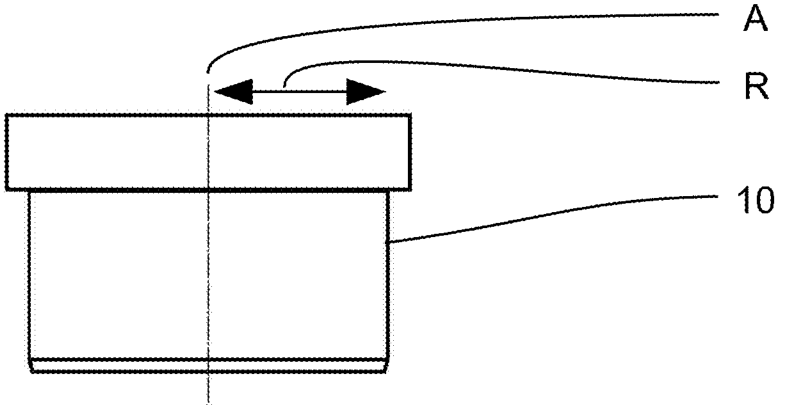
FIG. 8 shows a first view of a structural member.
Figure 9:
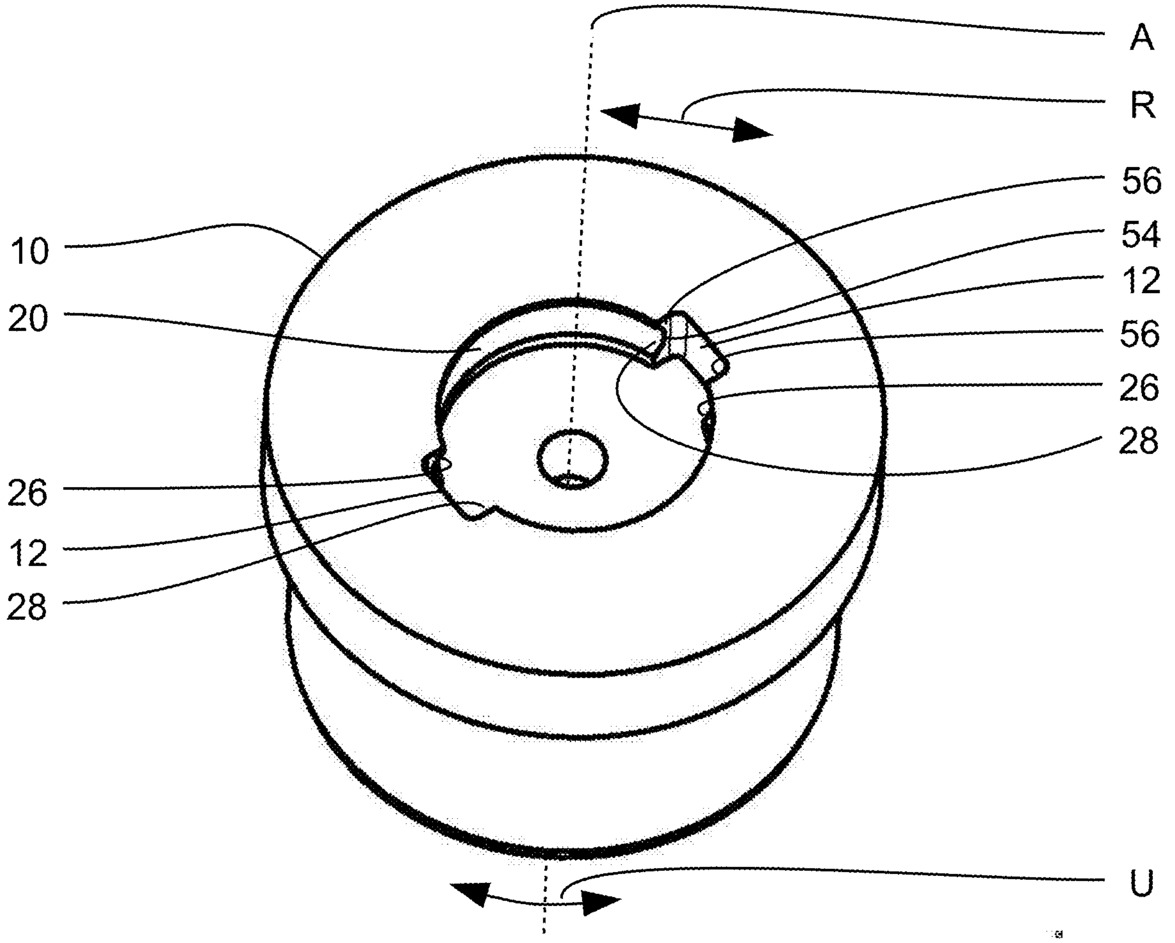
FIG. 9 shows a perspective view of the structural member from FIG. 8.

Each latching receptacle 12 can have a width in the circumferential direction U. Each latching receptacle 12 can have opposite side walls 56, with the latter either being able to run parallel to each other or being able to enclose an angle W1 with each other. The parallel configuration is shown in FIG. 3*b*. The angular configuration is depicted in FIG. 4*b*. In the latching position S1, the latching elements 6 are located in latching receptacles 12, each latching element 6 projecting by a distance into the latching receptacles 12, specified as an engagement depth E. Each latching receptacle 12 has an inlet edge 26 and also an outlet edge 28. The inlet edge 26 and also the outlet edge 28 are the impact edges between the latching element running surface 22 and the latching receptacle 12. The latching element 6 can enter the latching receptacle 12 via the inlet edge 26 and the latching element 6 can exit from the latching receptacle 12 via the outlet edge 28.

The overload clutch arrangement furthermore comprises a sensor arrangement, comprising a first sensor target 32, which is rotationally fixed to the structural member 10, a second sensor target 34, which is rotationally fixed to the drive shaft 36, a first sensor 38 for sensing the first sensor target 32, and a second sensor 40 for sensing the second sensor target 34. The first sensor target 32 is fixedly arranged on the guide rod 30 at the end opposite the structural member 10. The first pair of sensors, formed from the first sensor 38 and the first sensor target 32, is arranged on the output side. The second pair of sensors, formed from the second sensor 40 and the second sensor target 34, is arranged on the drive side.

The invention is not restricted to any one of the embodiments described above and instead can be modified in a very wide variety of ways. All of the features and advantages apparent from the claims, the description, and the drawing, including structural details, spatial arrangements, and method steps, may be essential to the invention both individually and in a very wide variety of combinations.

The invention encompasses all combinations of at least two of the features disclosed in the description, the claims, and/or the figures.

To avoid repetition, features disclosed in relation to a device are also considered, and can be claimed, to be disclosed in relation to a method. It is likewise the case that features disclosed in relation to a method are considered, and can be claimed, to be disclosed in relation to a device.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

| List of reference signs | |
|---|---|
| 2 | Guide means |
| 2a | Cage sleeve |
| 2b | Interior |
| 2c | Fastening surface |
| 4 | Bore |
| 6 | Latching element |
| 6a | Ball |
| 8 | Displacement element |
| 8a | Outer circumferential surface |

-continued

| List of reference signs | |
|---|---|
| 10 | Structural member |
| 12 | Latching receptacle |
| 14 | Spring means |
| 14a | Disc spring package |
| 16 | Adjusting sleeve |
| 18 | Damping means |
| 18a | Damping ring |
| 20 | Recess |
| 22 | Latching element running surface |
| 24 | Inner circumference |
| 26 | Inlet edge |
| 28 | Outlet edge |
| 30 | Guide rod |
| 32 | First sensor target |
| 34 | Second sensor target |
| 36 | Drive shaft |
| 38 | First sensor |
| 40 | Second sensor |
| 42 | Housing |
| 44 | Drive |
| 46 | Transmission components |
| 48 | Gearwheel |
| 50 | Guide hole |
| 52 | Internal toothing |
| 54 | Circular arc contour |
| 56 | Side wall |
| A | Longitudinal axis |
| B | Width |
| G | Plain bearing |
| K | Force flux path |
| S1 | Latching position |
| S2 | Freewheeling position |
| U | Circumferential direction |
| W1 | Angle |
| W2 | Angle |

What is claimed is:

1. An overload clutch arrangement, through which a longitudinal axis (A) passes, comprising:

a guide means;

at least one latching element movably received in a bore of the guide means;

a structural member having a latching receptacle; and a displacement element movable along the longitudinal axis (A) so as to displace the at least one latching element into the latching receptacle of the structural member;

wherein the at least one latching element is adjustable between i) a latching position in which the at least one latching element engages the latching receptacle and rotationally fixedly couples the guide means to the structural member and ii) a freewheel position in which the at least one latching element is arranged outside the latching receptacle and allows freewheeling of the structural member relative to the guide means, wherein the structural member has a recess at an axial end facing the displacement element, the recess being formed at an inner circumferential surface of the structure member, wherein the latching receptacle and a latching element running surface are formed in the recess of the structural member, wherein the latching element running surface is configured such that the at least one latching element runs on the latching element running surface in the freewheel position.

2. The overload clutch arrangement according to claim 1, wherein the guide means is a cage sleeve.

3. The overload clutch arrangement according to claim 1, wherein the guide means is arranged in a force flux path.

4. The overload clutch arrangement according to claim 1, wherein the at least one latching element is a ball.

5. The overload clutch arrangement according to claim 1, wherein the displacement element has an outer diameter which tapers along the longitudinal axis.

6. The overload clutch arrangement according to claim 5, wherein the outer diameter of the displacement element tapers along the longitudinal axis (A) in a direction of the structural member.

7. The overload clutch arrangement according to claim 1, further comprising:

a spring means which pretensions the displacement element in a direction of the at least one latching element, as a result of which the at least one latching element is pretensioned into the latching position.

8. The overload clutch arrangement according to claim 7, wherein the spring means is a disc spring package.

9. The overload clutch arrangement according to claim 7, further comprising:

an adjusting sleeve which preloads the spring means in the direction of the at least one latching element.

10. The overload clutch arrangement according to claim 7, further comprising:

a damping means arranged within the guide means and for reducing noise from the overload clutch arrangement.

11. The overload clutch arrangement according to claim 10, wherein the damping means is a damping ring.

12. The overload clutch arrangement according to claim 1, wherein the latching receptacle has a width in a circumferential direction in a range of 0.5 to 1.5 times a diameter of the at least one latching element.

13. The overload clutch arrangement according to claim 1, wherein the latching receptacle has opposite side walls which run parallel to each other or enclose an angle in a range of 10° to 90° with each other.

14. The overload clutch arrangement according to claim 1, wherein when the at least one latching element is in the latching position, the latching receptacle has an engagement depth for the at least one latching element which is in a range of 0.1 to 0.45 times a diameter of the at least one latching element.

15. The overload clutch arrangement according to claim 14, wherein the engagement depth is 0.33 times the diameter of the at least one latching element.

16. The overload clutch arrangement according to claim 1, wherein the latching receptacle has an inlet edge which has a rounding with a radius.

17. The overload clutch arrangement according to claim 1, wherein the latching receptacle has an outlet edge which has a rounding with a radius.

18. The overload clutch arrangement according to claim 1, further comprising:

a guide rod fixedly connected to the structural member.

19. The overload clutch arrangement according to claim 1, further comprising a sensor arrangement, wherein the sensor arrangement comprises:

a first sensor target rotationally fixed to the structural member;

a second sensor target rotationally fixed to a drive shaft;

a first sensor for sensing the first sensor target; and a second sensor for sensing the second sensor target.

* * * * *